United States Patent [19]

Dieulot et al.

[11] 4,323,770

[45] Apr. 6, 1982

[54] UNIT PARTICULARLY FOR TAKING STAKES AND POSSIBLY DETERMINING THE WINNERS IN A GAME SUCH AS A NATIONAL LOTTO GAME

[75] Inventors: Gerard Dieulot; Mathias Juan, both of Paris; Michel Fardeau, Les Milles, all of France

[73] Assignee: Societe d'Etude de Systems Avances et d'Amenagements, Neuilly-sur-Seine, France

[21] Appl. No.: 57,887

[22] Filed: Jul. 16, 1979

[30] Foreign Application Priority Data

Aug. 16, 1978 [FR] France ............................... 78 23934

[51] Int. Cl.[3] ...................... G06F 15/20; G06F 15/44; G06K 3/12

[52] U.S. Cl. .................................... 235/375; 235/432; 364/412

[58] Field of Search ............... 235/375, 432, 433, 442, 235/487, 92 TA, 92 TS; 364/412; 340/152 T

[56] References Cited

U.S. PATENT DOCUMENTS

| | | | |
|---|---|---|---|
| 3,124,674 | 3/1964 | Edwards | 364/412 |
| 3,327,292 | 6/1967 | Eriksson | 364/412 |
| 3,786,234 | 1/1974 | Trent | 364/412 |
| 4,031,376 | 6/1977 | Corkin | 364/412 |
| 4,072,930 | 2/1978 | Lucero | 364/412 |

*Primary Examiner*—Robert M. Kilgore
*Attorney, Agent, or Firm*—Scully, Scott, Murphy & Presser

[57] ABSTRACT

An apparatus for receiving and processing bets on games, as Lotto, in which a central processing unit is connected to at least one member for entering information, as a keyboard, a unit for recording information and at least one printer for delivering an appropriately marked receipt ticket.

8 Claims, 5 Drawing Figures

PLAYER'S KEYBOARD

PLAYER'S KEYBOARD

CASHIER'S KEYBOARD

UNIT PARTICULARLY FOR TAKING STAKES AND POSSIBLY DETERMINING THE WINNERS IN A GAME SUCH AS A NATIONAL LOTTO GAME

The present invention relates to a unit particularly for taking stakes and possibly determining the winners in a game such as a National Lotto game.

It has more particularly as its aim, but not exclusively, the provision of a system for playing National Lotto designed for countries having a low density of population and infrastructures, in which the provision of a game of Lotto of conventional type is not adapted.

It will be recalled that the game of National Lotto uses a participation form comprising numbered grids on which the players must determine, for example by marking the corresponding squares, one or more series of numbers.

In its best known version, a participation form comprises eight grids of 49 figures. Among these latter, the player uses a number of grids corresponding to the sum which he wishes to stake and must choose six figures in each of these grids.

Having filled in his participation form, of which he keeps a copy, the player hands it in at a validation center where he pays his stakes.

Examination of the forms may be made manually or by means of a reading chain connected to a computer which determines the winning numbers and calculates the amount of the winnings.

It is clear that such a game of Lotto requires a considerable infrastructure to be set up as well as considerable means for collecting the forms.

It uses participation forms which are handled often and, consequently, are subject to losses or damage.

Thus, even in the case where automatic reading chains are used, numerous forms among which some are valid, are rejected. It is therefore necessary to provide operators for sorting these forms so as to recover therefrom those which are valid and to transmit to the computer the information relative to these forms.

It is obvious that, during these operations, the risk of error is relatively high.

To get over these disadvantages, the invention proposes a system in which the acquisition of the forecasts of the players, the collection of their stakes, and possibly the determination of the winners and the winnings may be carried out by means of possibly mobile units, for example on specially adapted travelling vans, so that any problem relative to said collection is therefore eliminated.

Furthermore, this system may operate without the aid of physical media comparable to the conventional forms, the player being able to make his forecasts on a keyboard connected directly to the acquisition unit, which does away with all the disadvantages relative to the participation forms and the handling thereof.

To reach this result, the Lotto system of the invention provides an assembly, mobile or stationary, comprising a central unit to which are connected at least one member for entering information such as a keyboard on which the players may enter their stakes, a unit for recording information proper to the play supplied by the keyboard and identification and checking information, as well as a printer delivering a receipt ticket, which forms the proof of payment for the possible winnings of the bettor and which reproduces all the information acquired from the information recorded by the recording unit.

More precisely, the information to be collected and issued by said assembly consists essentially of:

(a) the forecast that the player generates on the keyboard, (b) information generated by the central unit, but specific to the player, such as the amount of his stake, identification numbers of the play, a sequential number for detecting any missing stakes or accounting errors, information corresponding to the kind of wager of the wagers (one play comprising perhaps several wagers), (c) information specific to the validation point and in the case of a mobile assembly which are memorized in each station, (d) possibly a key code allowing coded checking of the information serving, on the one hand, to show up glaring errors and, on the other hand, to reconstitute the wagers effected by the players in the case of poor reading.

The drawing of the winning combination and/or the sorting out of the winning bets may be achieved by the assembly, or else by a processing center having a conventional control computer. In this latter case, the information contained in duplicate (as a measure of security) in the recording units of the assembly are transmitted to this computer which is consequently provided with peripherals appropriate to the type of transmission used (cassette transfer, telecommunication, etc . . . ). The central computer then determines the amounts for each rank of winnings then issues lists of winners for example in cassette or printed list form.

According to other characteristics of the invention, said mobile assembly comprises two recording units for example magnetic tape units coupled to the central unit by means of a forming coupler.

The members for entering information may consist of keyboards or card, mark or form readers, coupled to the central unit by means of a bus. With the help of these keyboards the player enters combinations of numbers (bets) by pressing the corresponding keys and may delete one or more numbers by again pressing the keys to be deleted. He may then validate his bet by pressing a validation key. One of these keyboards may be for the cashier and may comprise keys for different functions. Each keyboard may comprise its own processing logic and may call up the central microprocessor at the end of the play. It may furthermore comprise a display member allowing the player to read the numbers which he has entered, the cumulative amount to be paid and possibly the number of bets. The display of this amount is repeated so that the cashier may read it.

For each of the keyboards, the operations effected by the central unit may be the following:

scanning the keyboard and detection of the release of a key;

determination of the code of the considered key (it may be a function or number key);

cancelling of the key when it is again actuated (solely for the number keys);

the processing of the numbers which comprises:

buffer stacking of the numbers, display of the key considered for example by means of indicator lights associated with the keys, checking of the number of numbers per wager, the "multiple wager" information (for example by winking of the indicator lights), checking the number of wagers, return to keyboard scanning;

the processing of the function keys which comprises:

the validation which is only effected if the number of numbers chosen is compatible with the rules of the game, checking of the total amount to be paid, display of the wager on a display unit, resetting of the indicator lights of the keyboard, return to scanning the keyboard;

display on request (for example by pressing a key indicating an upward pointing arrow) of the preceding stake(s), and scanning of the keyboard;

display of the following bets (for example by pressing a key indicating a downward pointing arrow), this control only being effected after an "upward pointing arrow" control until the last wager, except if the amount is higher than the upper stake limit, this operation being followed by return to scanning the keyboard;

the end of play order which is effected if at least one wager is displayed on the display unit and which blocks the keyboard while waiting for payment and validation of the play by the cashier, which allows:

the taking of bets by transfer of the list of bets when the bus is available, this operation comprising:

the printing order of the magnetic tapes with checking coders, rereading of this tape, the order for printing the "receipt ticket"

the control of the guillotine, resetting of all the arrays, return to scanning the keyboard.

The central unit may effect, after the bets have been taken and after drawing the winning combination, the analysis of the results, this analysis comprising:

reading the different magnetic tapes in a first unit, the sorting out of the winning bets and their recording in the second recording unit.

One embodiment of the invention in its mobile version will be described hereafter, by way of non-limiting example, with reference to the accompanying drawings in which.

Figure 1:
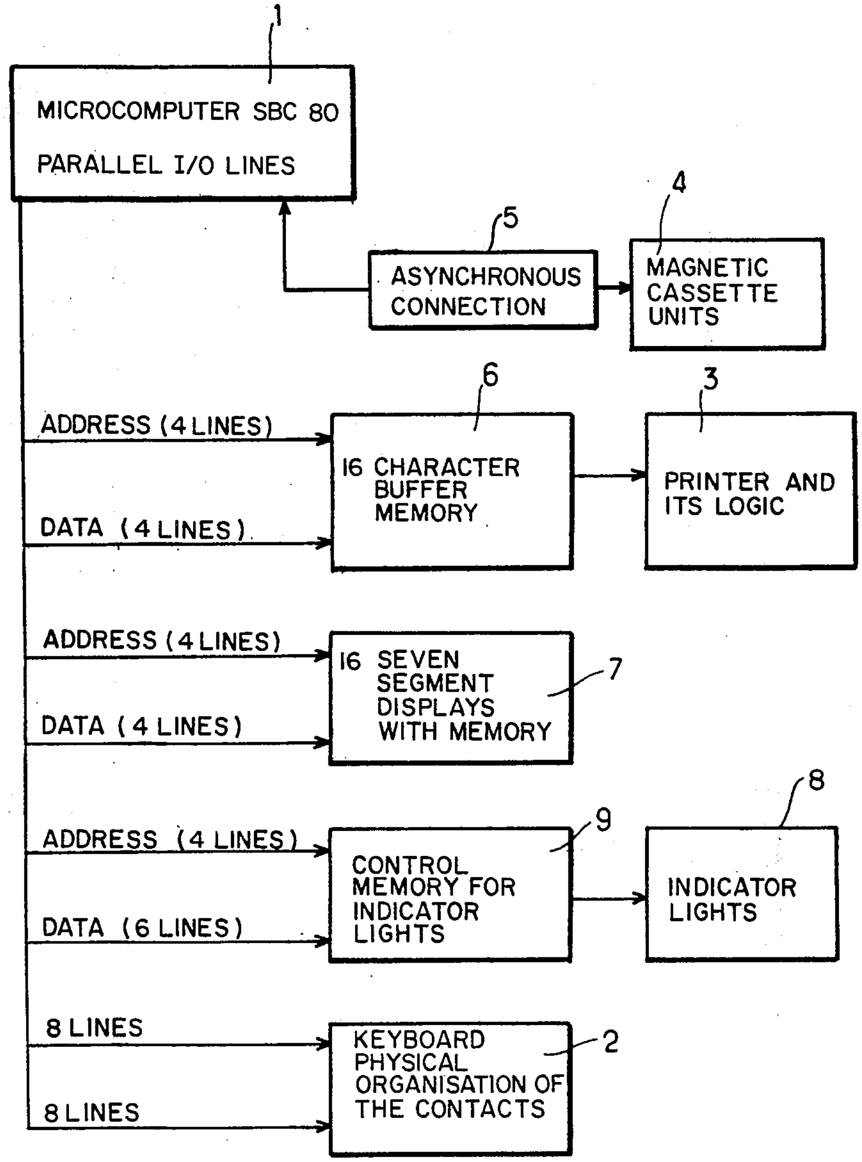
FIG. 1 is a block diagram of a mobile assembly for mounting aboard a vehicle such as a van.

In this example, the acquisition of the bets of the players and the collection of their stakes is made by means of mobile assemblies, that is to say specially fitted travelling vans and comprising essentially:

a central unit 1 controlling:

acquisition keyboards 2, receipt ticket printers 3, a unit 4 for recording and reading commercial magnetic cassettes, able to be read directly by a conventional computer peripheral.

The cassettes duplicated as a measure of security may be sent (by van for example) to a processing center having a simple conventional control computer provided with cassette reading peripherals.

After drawing the winning combination, the sorting out of the winning forecasts is made by means of the computer, which then determines the amounts for each rank of winnings, then issues lists of winners in cassette or printed list form.

The vans set off again with these lists of winners which they pay during their round.

The computer also ensures the accountancy of the game from the magnetic tapes coming from the sorting out of the bets.

The information to be acquired and edited breaks down into the information to be acquired per player and the information to be edited per player.

The information to be acquired per player is the following:

a—the wager of the player for which 60 2-digit numbers are provided separated from one another and in groups of 10, i.e.: $60\times2+60+10=190$, b—the amount of the stake: 3 digits, c—the number of the draw: 3 digits, d—the number of the van: 2 digits, f—the number of the keyboard: 2 digits, g—the number of the region: 1 digit, h—the number of the village: 4 digits, i—the sequential number of the form: 6 digits, j—the random number: 8 digits, k—the number of the type of form: 2 digits, l—the zone separation symbols: 7 m—the key code: 10 to 12 digits, n—the second random number of 6 digits, i.e. a total of: $190+57=247$ digits of which 76 are zone separation symbols or spaces.

The information in c, d, g and h are specific to the validation point and may then be memorized for each stop of the van.

Information (a) is generated by the player on a keyboard.

Information b, f, i, j, k and m is generated by the central unit of the mobile assembly but specific to the player.

Information (b) (amount of the stake) by counting the wagers recorded on the tape (payment errors are the responsibility of the official and the player).

Information (i) (sequential number) is a simple sequential number specific to the central unit. The sequence of these numbers allows any missing wagers to be discovered or accountancy errors (by comparing with information b). The means for generating this sequential number must be inaccessible to the official and protected from power supply cuts so as to obtain an uninterrupted sequence of operations.

Information (j) is a random number of 8 digits which must have no correlation either with the sequential number (information i) or with the "van-validation point" code (information d, f, g, h). This random number may furthermore serve for providing a lottery of the instantaneous type.

Information (k) corresponds to a type of formulation of the bets (single and multiple forms of the French Lotto comprising either several single grids with 6 crosses, or a multiple grid where 7, 8, 9 or 10 crosses may be forecast).

Information (m) is a coded check of information (a) decodable by means of a micro-programme (for example a programmable pocket calculator) serving, on the one hand, to confound glaring frauders and, on the other hand, to reconstitute information (a) in the case of poor reading.

Information (n) is a second random number of 6 digits without correlation with the first (information j) nor with information d, f, g, h, i.

The whole of this information is acquired in duplicate on two independent supports (cassettes) one of which will serve for the subsequent data processing while the other will be kept as a measure of security as reference.

Insofar as the acquisition is concerned at the moment of paying the winnings, the list of winners, classified by "validation point" may be recorded on a magnetic medium of the same type as that for the acquisition (cassette) or edited in the form of printed lists.

Each winner is identified by the number of the draw (information c), the "van-validation point" code (information d, f, g, h), the sequential number (information i) and the first random number (information j). The official checks that the information printed on the receipt ticket of the winner are in accordance with those which he has read on the cassette or on the printed list (by issuing a ticket for example) and justifies the payment of the winner by entering in the area left free for this purpose on the tape-list of winners the second random number read on the receipt ticket of the winner and which does not appear on this tape-list. He keeps this receipt ticket after cancelling it.

In the case where the list of winners is a printed list, the cashier enters on the cassette for taking down the bets the information justifying the payments which have been made.

Insofar as the information to be edited per player is concerned, the player receives a receipt ticket reproducing the whole of the acquired information.

This receipt ticket is printed from information effectively written on the magnetic medium (and not from keyboards), reread from a special reading head (which will serve for reading the list of the winners on the cassettes for payment of the players).

The information is printed in duplicate:

on a receipt ticket given to the player against the payment of his stake, on a continuous reference tape inside the machine and not accessible to the official (the key is in the hands of the person responsible for collecting the cassettes and this reference tape). This tape, placed in safe keeping before the draw, is the authentic one in the case of a dispute at law.

The type of keyboard used may be varied and may comprise as many keys as there are numbers appearing on the grids, or else only the keys numbered from 0 to 9, which implies a combination for the numbers exceeding ten by the player.

This keyboard may also be alphanumeric to allow the player to indicate his name and address particularly for payment by cheque.

Finally, each keyboard may be provided with a printer issuing a "draft ticket" indicating particularly to the cashier the amount to be collected.

Another improvement could consist in giving to the player the possibility of completing his favourite numbers by numbers chosen at random by the computer.

PHYSICAL CONFIGURATION OF ONE EMBODIMENT OF THE SYSTEM

The central unit 1, typically a microcalculator "SBC" (Single Board Computer) which utilizes an INTEL 8080 micro-computer card provided with 1 K eight-bit bytes of working memory and 4 K eight-bit bytes of programmable memory.

The magnetic cassette unit 4 corresponding to magnetic tape cassettes and, in a preferred embodiment, tapes of the Quantex 2200 type, is connected to the micro-computer 1 by a standard asynchronous interface type RS 232 C (connection 5).

The two printers, i.e. the ticket printer 3 corresponding to a printed logic circuit, preferably the SORENEC SC 13.16 k type, and an emergency printer not shown, consist of a drum printer with 16 numerical character columns and a few alphanumeric characters, these two printers being connected to the micro-computer 1 by means of a parallel-mode coupler corresponding to a buffer memory bank preferably of the Texas Instrument bipolar integrated circuit type.

The keyboards 2 (only one of which has been shown) comprise 47 stake keys, 4 function keys, a numerical character display unit 7, which is in a preferred embodiment of the Texas Instrument TIL 309 type, and are connected to the micro-computer 1 by means of a parallel-mode coupling card consisting of a wiring network upon a printed circuit. N stake keyboards are provided and a cashier's keyboard which is identical to the stake keyboards, but whose function keys are interpreted differently.

The micro-computer 1 operates by addressing the keyboards, each keyboard having its own address, comprising its own processing and memorizing logic and calling up the micro-computer 1 at the end of play.

With each of the keys of each of the keyboards, there is furthermore associated an indicator light 8 preferably of the "Jean Renaud" type manufactured in France, associated with a control memory 9 and which lights up when the key has been actuated. For the number keys, this indicator light goes out and the corresponding information is cancelled when the same key is used twice.

Figure 2:
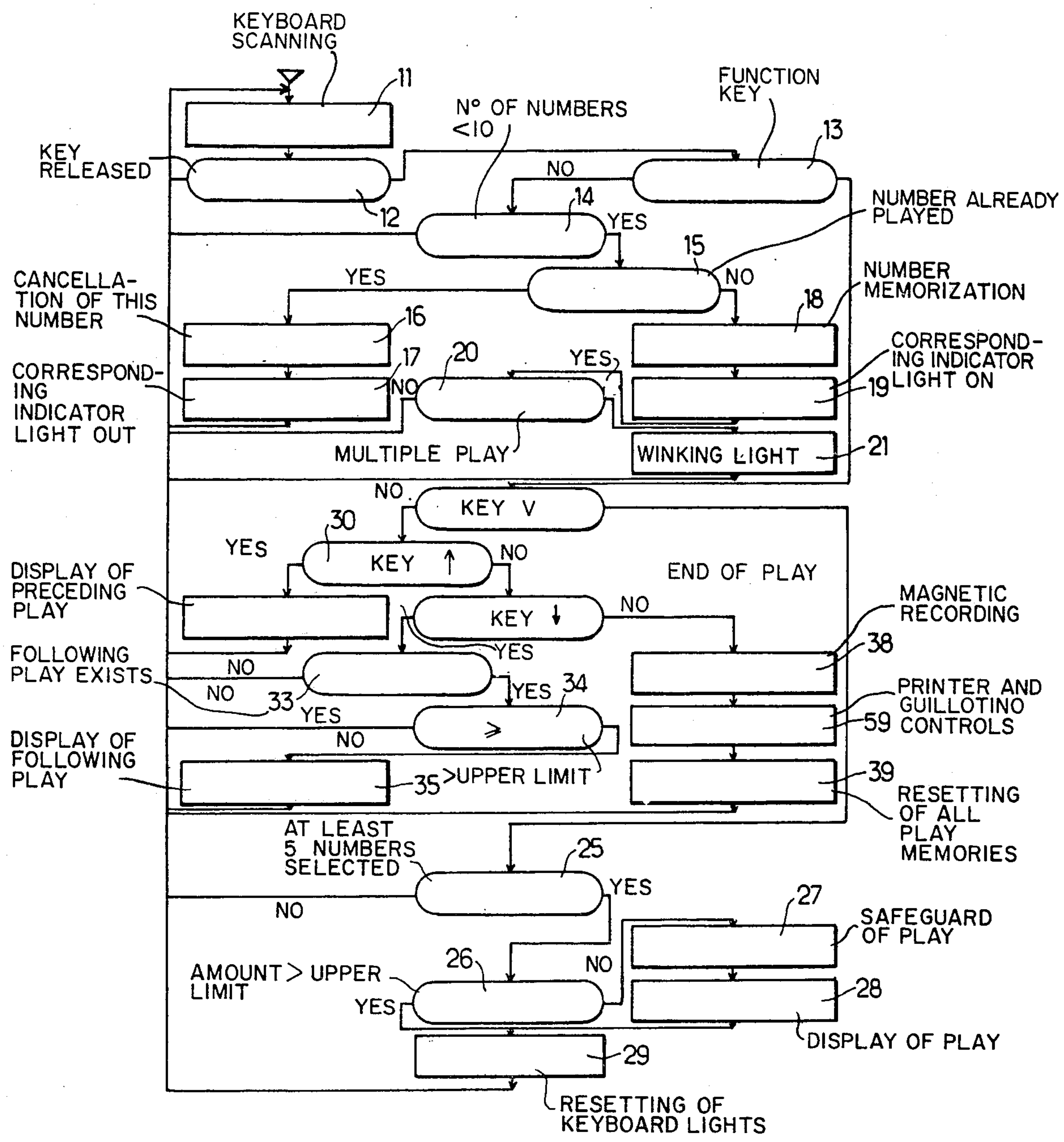
FIG. 2 is a flow chart of the software of the system shown in FIG. 1.
Figure 3:
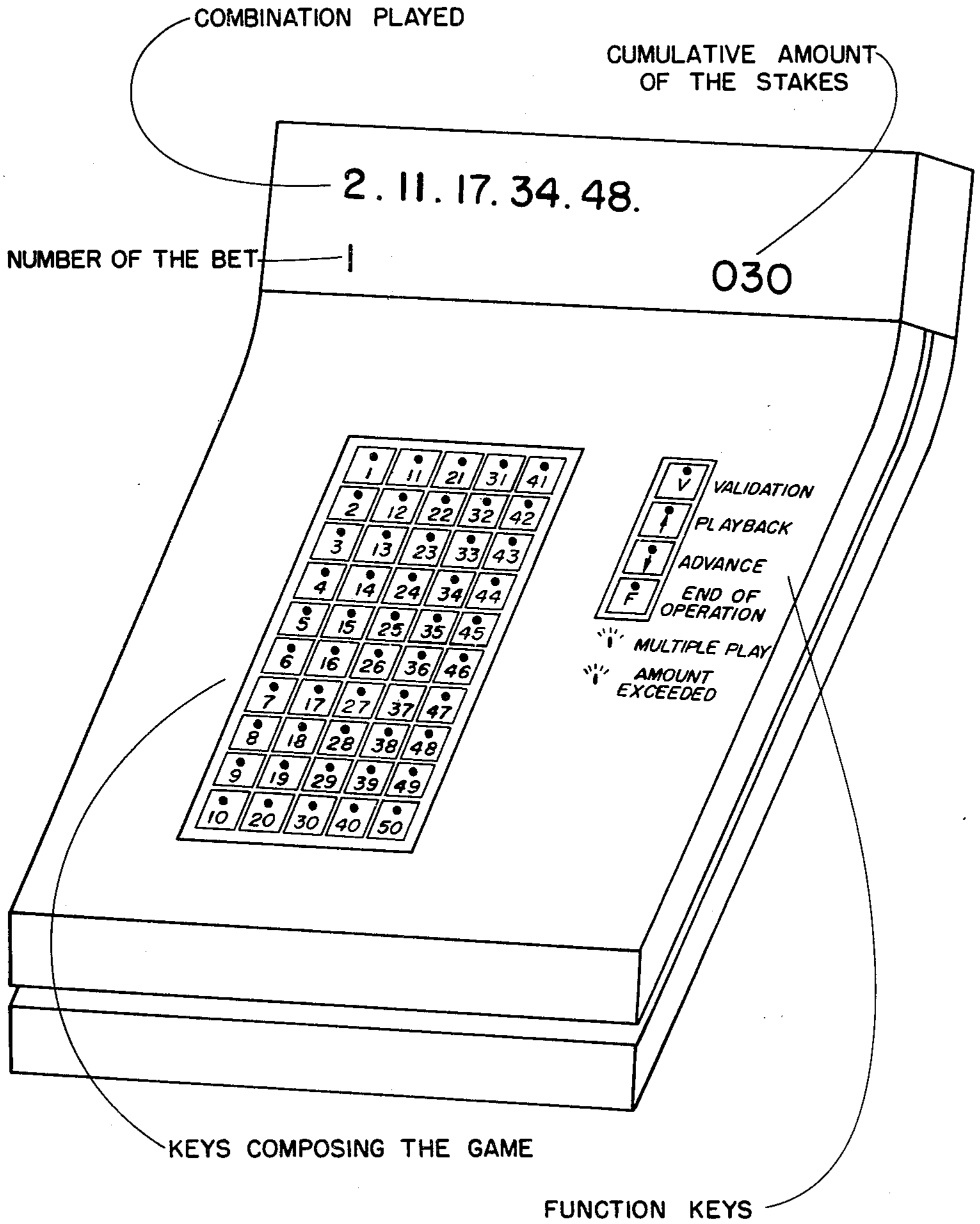
FIG. 3 is a perspective view of a player's keyboard according to the present invention.
Figure 4:
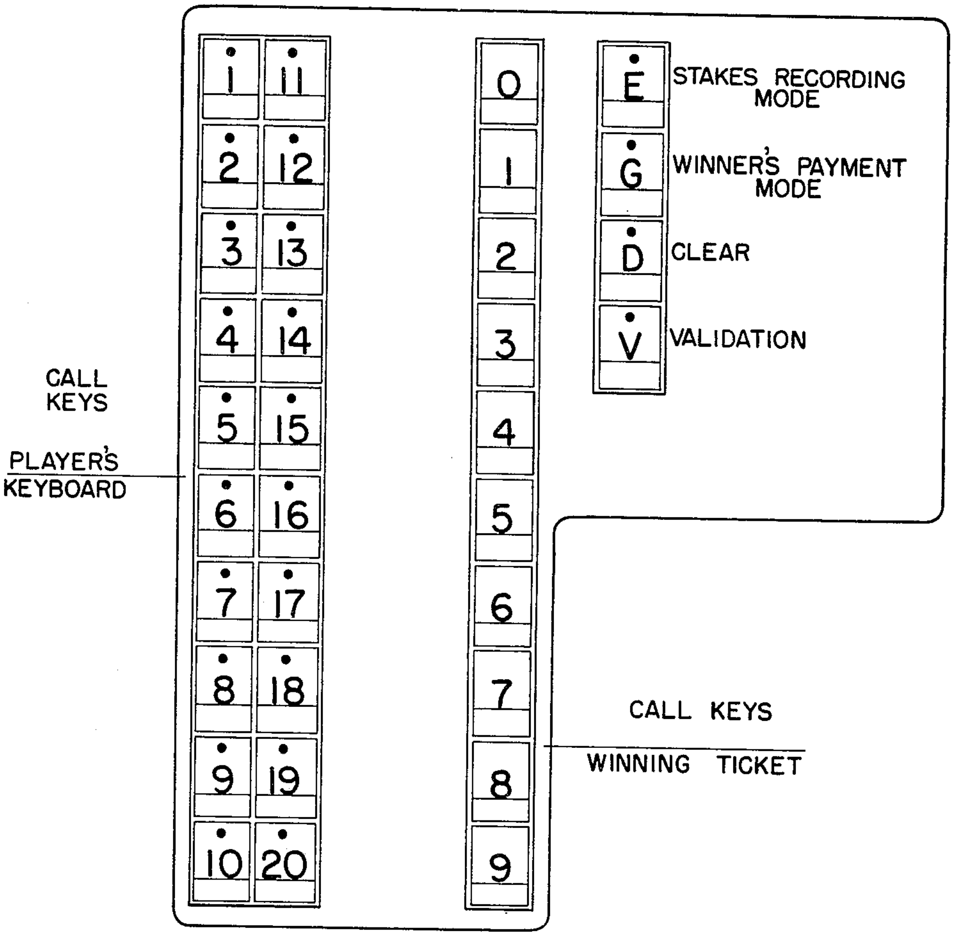
FIG. 4 is a front view of the cashier's keyboard according to the present invention.
Figure 5:
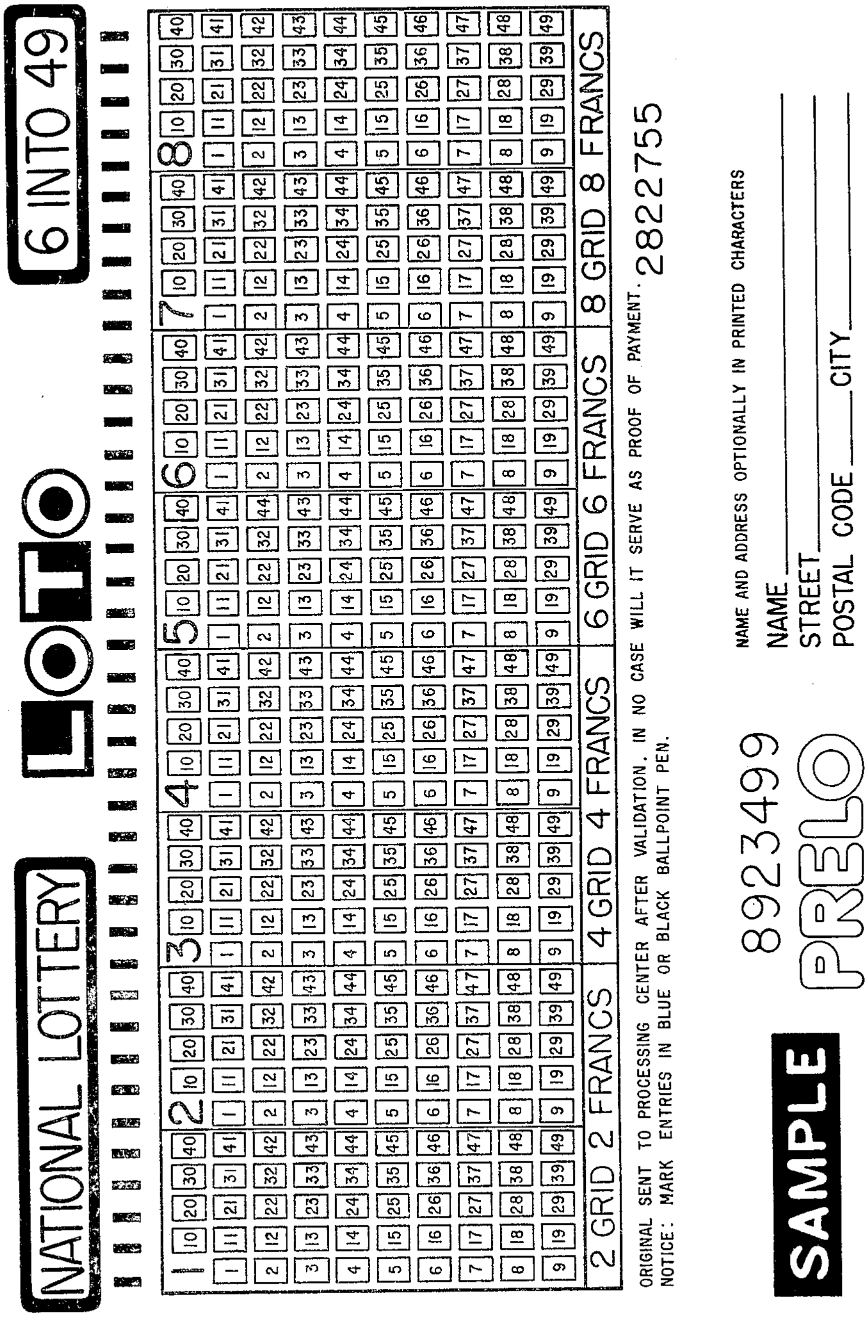
FIG. 5 is a diagram of a typical national lotto card which can be used according to the present invention.

With reference to FIG. 2, the sequential succession of operations carried out by the assembly comprises, for each of keyboards 2:

scanning of keyboard 2 (block 11) and detection of the release of a key (block 12);

determination of the code of the key considered (blocks 13 and 14): function or number key;

processing of the numbers which comprises:

the checking of the number of numbers per bet (block 14) with cancelling of the numbers already played (block 15) and extinction of the corresponding indicator light (blocks 16 and 17), buffer stacking of the numbers (block 18), display on the indicator lights of the keys considered (block 19), "multiple bet" information (block 20) and lighting up of a corresponding winking indicator light (block 21), checking the number of bets (with possible limitation), return to keyboard scanning;

the processing of the function keys comprises:

validation (block 25) which is only effected if at least 5 numbers have been selected, checking the total amount to be paid (block 26), with possible limitation and in this case lighting up of a corresponding indicator light, the transfer of numbers played into a final stack (block 27), display of the bet on a display unit (block 28), resetting of the keyboard indicator lights (block 29), return to keyboard scanning;

the "upward pointing arrow" control (block 30) which comprises:

display of the preceding bet (block 31), keyboard scanning, this control being able to be repeated until the first bet is displayed;

the "downward pointing arrow" control (block 32) for display of the next bet (block 35); this control is only possible after an "upward pointing arrow" control and may be repeated until the last bet unless the amount exceeds the upper limit (blocks 33 and 34);

the end of play order (all the bets of a player) is only possible if at least one bet is displayed on the display unit, the complete play going from the first bet to that displayed on the display unit, this order comprises:

the order for the recording on cassettes (block 38), rereading of this tape, the control of the printer and the guillotine (block 39), resetting of all the displays (block 40), return to scanning the keyboard.

The central unit may carry out, after the bets have been taken and after the winning combination has been drawn, the analysis of the results, this analysis comprising reading the magnetic tapes on a first unit, sorting out the winning bets, the calculation of the amount of the stakes and recording of this information on the second recording unit.

In a second stage, rereading of the tape of the winners permits the list of winners to be edited with the corresponding winnings.

A rapid printer will then be able to be coupled to the micro-computer, for example to the series interface.

It is to be understood that during this analysis, all the necessary checks may be made for avoiding frauds.

We claim:

1. An integrated assembly for taking and processing stakes particularly for the game of Lotto, this assembly comprising a micro-processor to which are connected:

(a) at least one keyboard for the players, which comprises a series of number keys on which the player can generate his forecast and on each of which is associated an indicator light which lights up when the key is activated once and goes out when the key is activated twice, and function keys comprising at least a bet validation key which controls the display of bets entered by the player and the cumulative amount of the stakes on a display unit, said cumulative amount being reported in such a way as to be read by an operator, a key to permit the retroactive display of the preceding bets on the said display unit, a key controlling the successive redisplay of the bets, and an end-of-play key to block the keyboard while waiting for payment;

(b) one keyboard for the cashier which comprises at least for each keyboard of the players, a validation key allowing to clear said player keyboard, after payment and to control the printing of a receipt ticket;

(c) an information recording unit proper to the play furnished by the said keyboards along with identification and checking information, this unit being controlled by the validation key of the cashier's keyboard;

(d) a printer to deliver the receipt ticket which forms the proof for payment of the possible winnings of the bettor and which reproduces the whole of the information acquired from the information recorded by the recording unit; and (e) operations carried out for each of the keyboards by the micro-processor are the following:

(a) scanning of the keyboard and detection of the release of a key;

(b) determination of the code of the key considered;

(c) cancelling of the key when it is again actuated;

(d) processing of the numbers which comprises buffer stacking of the numbers;

the checking of the number of the numbers per wager;

multiple wager information (for example by winking of the indicator lights);

checking the number of wages;

return to keyboard scanning;

(e) processing of the function keys which comprises:

validation which is only effected if the number of the numbers chosen is compatible with the rules of the game;

checking of the total amount to be paid;

display of the wager on a display unit;

resetting of the indicator lights of the keyboard return to scanning the keyboard;

(f) display on request by pressing a key indicating an upward pointing arrow of the preceding play and scanning of the keyboard;

(g) display of the following bets by pressing a key indicating a downward pointing arrow this control being effected only after a control effectuated on the upward pointing arrow until the last wager, except if the amount is greater than the upper limit of the wagers, this operation being followed by return to scanning the keyboard;

(h) the end of the play order which is given if at least one bet is displayed on the display unit and which blocks the keyboard while waiting for payment and validation of the play by the cashier, which allows:

(i) the taking of bets by transfer of the list of bets, this operation comprising:

the order for printing from the recording unit with checking coders, rereading of this tape, the order for printing the receipt ticket, resetting of all the displays, return to scanning the keyboard.

2. An assembly according to claim 1, in which the said member for entering information comprises, in addition, at least one reader for the support of information particularly a perforated card reader.

3. An assembly according to claim 1, in which each of the keyboards comprises its own processing logic and calls up the microprocessor at the end of play.

4. An assembly according to claim 1, in which to each of the keys of the keyboard is associated a luminous signaling means connected to a control memory causing the lighting up of this unit when the corresponding key has been actuated.

5. An assembly according to claim 4, in which the control memory causes the extinction of the luminous unit associated with a key, when this key has been actuated twice.

6. An assembly according to claim 1, in which the printer prints in duplicate the receipt ticket on a continuous reference tape inside the machine and not accessible to the official.

7. An assembly according to claim 1, in which the said printer is adapted to print the different combinations played as well as, possibly, the amount to be payed, a sequential number, information about the validation point, a random number and a key code allowing coded checking of the information.

8. An assembly according to claim 1, in which the recording unit records in duplicate the information supplied by the unit for entering information, and in which the information of one of these copies is transmitted by a standard system of transmission to a processing center which effectuates the draw for the winning combination and possibly the sorting out of the winning forecasts.

* * * * *